United States Patent
Ko

[11] Patent Number: 5,769,114
[45] Date of Patent: Jun. 23, 1998

[54] CONTROL VALVE FOR USE IN A DUAL HANDLED HOT/COLD WATER MIXING FAUCET

[75] Inventor: Hsi-Chia Ko, Changhua Hsien, Taiwan

[73] Assignee: Chung Cheng Faucet Co., Ltd., Changhua Hsien, Taiwan

[21] Appl. No.: 762,859

[22] Filed: Dec. 10, 1996

[51] Int. Cl.⁶ .................................................. F16K 5/16
[52] U.S. Cl. ...................... 137/454.6; 521/127; 521/208
[58] Field of Search .................................... 251/208, 118, 251/127; 137/454.5, 454.6, 625.31

[56] References Cited

U.S. PATENT DOCUMENTS

| | | | |
|---|---|---|---|
| 3,433,264 | 3/1969 | Parkison | 251/127 X |
| 4,425,935 | 1/1984 | Gonzalez | 137/454.6 X |
| 5,176,168 | 1/1993 | Stoll et al. | 251/208 X |
| 5,348,042 | 9/1994 | Wagner et al. | 251/208 X |
| 5,490,540 | 2/1996 | Vom Dahl et al. | 251/127 X |

*Primary Examiner*—Kevin Lee
*Attorney, Agent, or Firm*—Bacon & Thomas

[57] ABSTRACT

An improved control valve for use in a mixing valve has a valve mount, a spindle assembly and a water restraining plate having two outlets. The spindle assembly has a spindle rod and a two staged valve body having a chamber at the lower portion thereof. In the chamber are a plurality of cylindrical posts, including four long posts and other short posts that are arranged in order. The cylindrical posts are used to reduce the noise of turbulent flow passing through the valve body and the four long posts support the water restraining plate in place and stop a spring biased sealing pad from dropping into chamber via the outlets. Thus, the spindle rod of the spindle assembly can be rotated more smoothly and the noise produced in operation can be minimized.

1 Claim, 3 Drawing Sheets

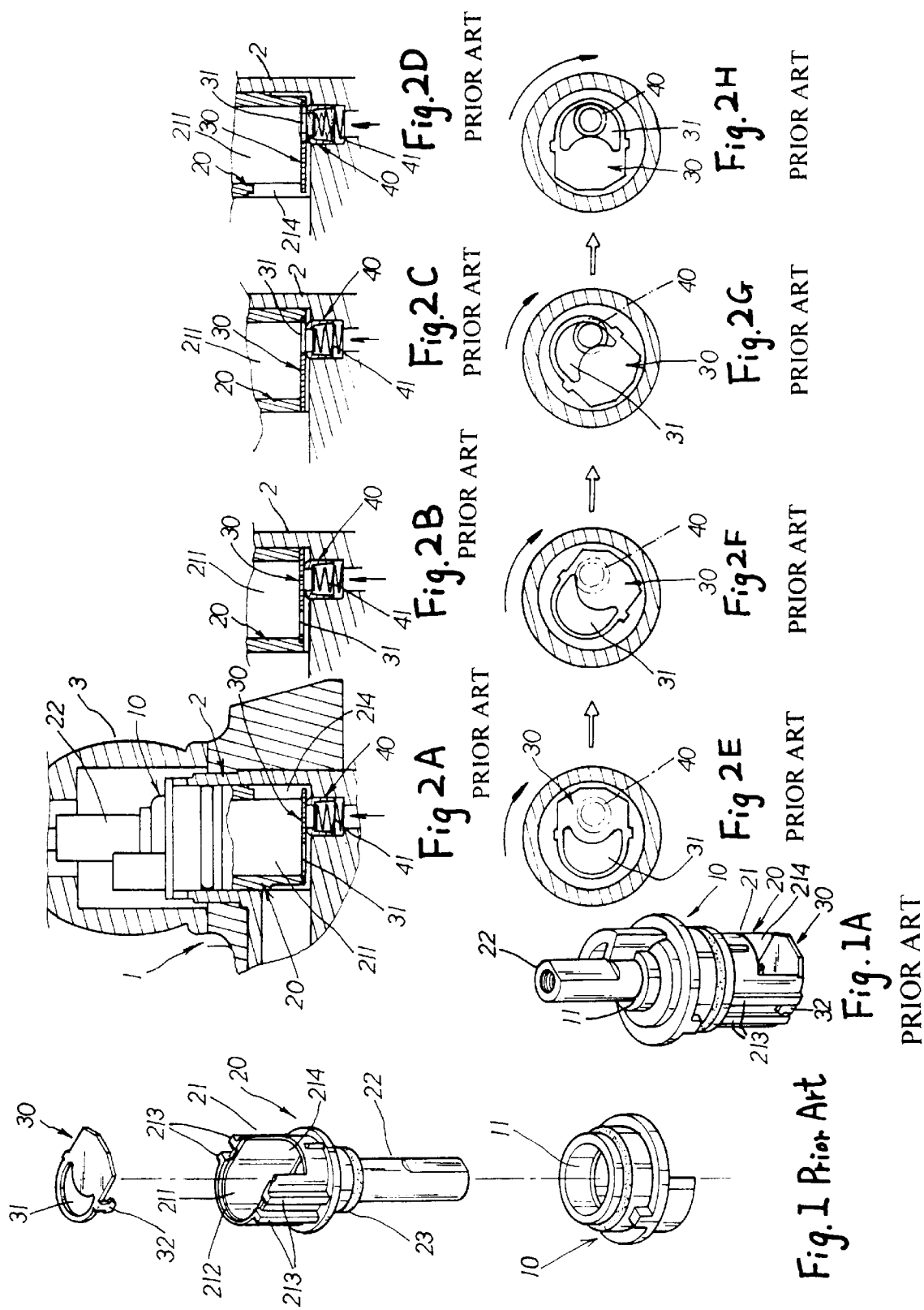

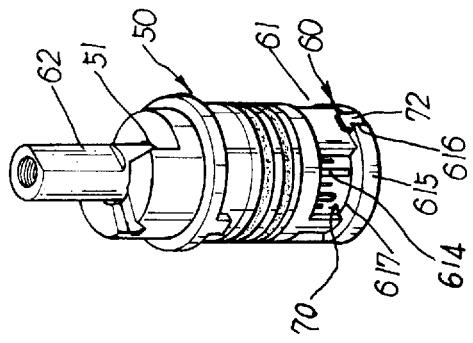
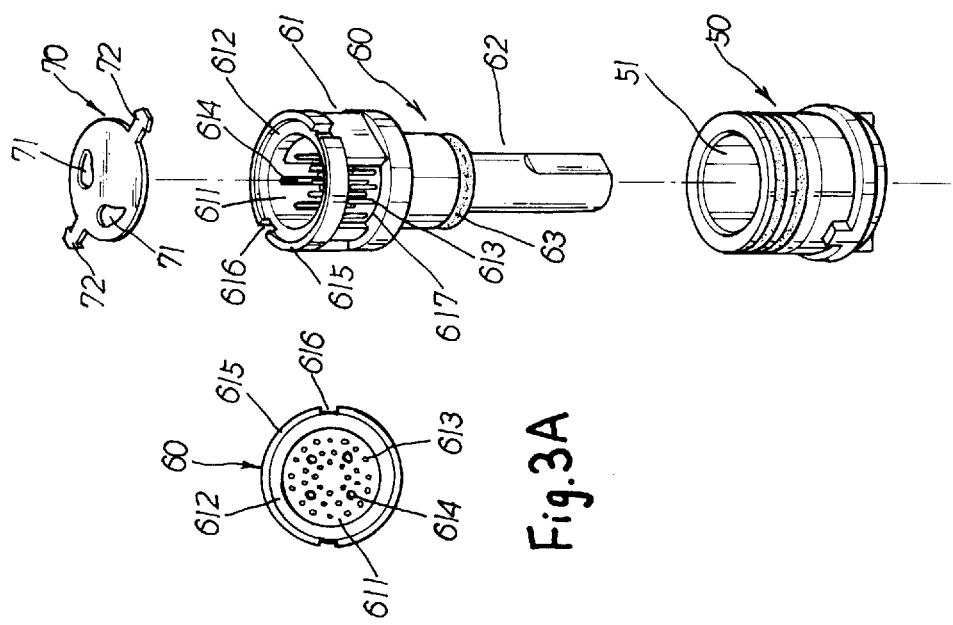

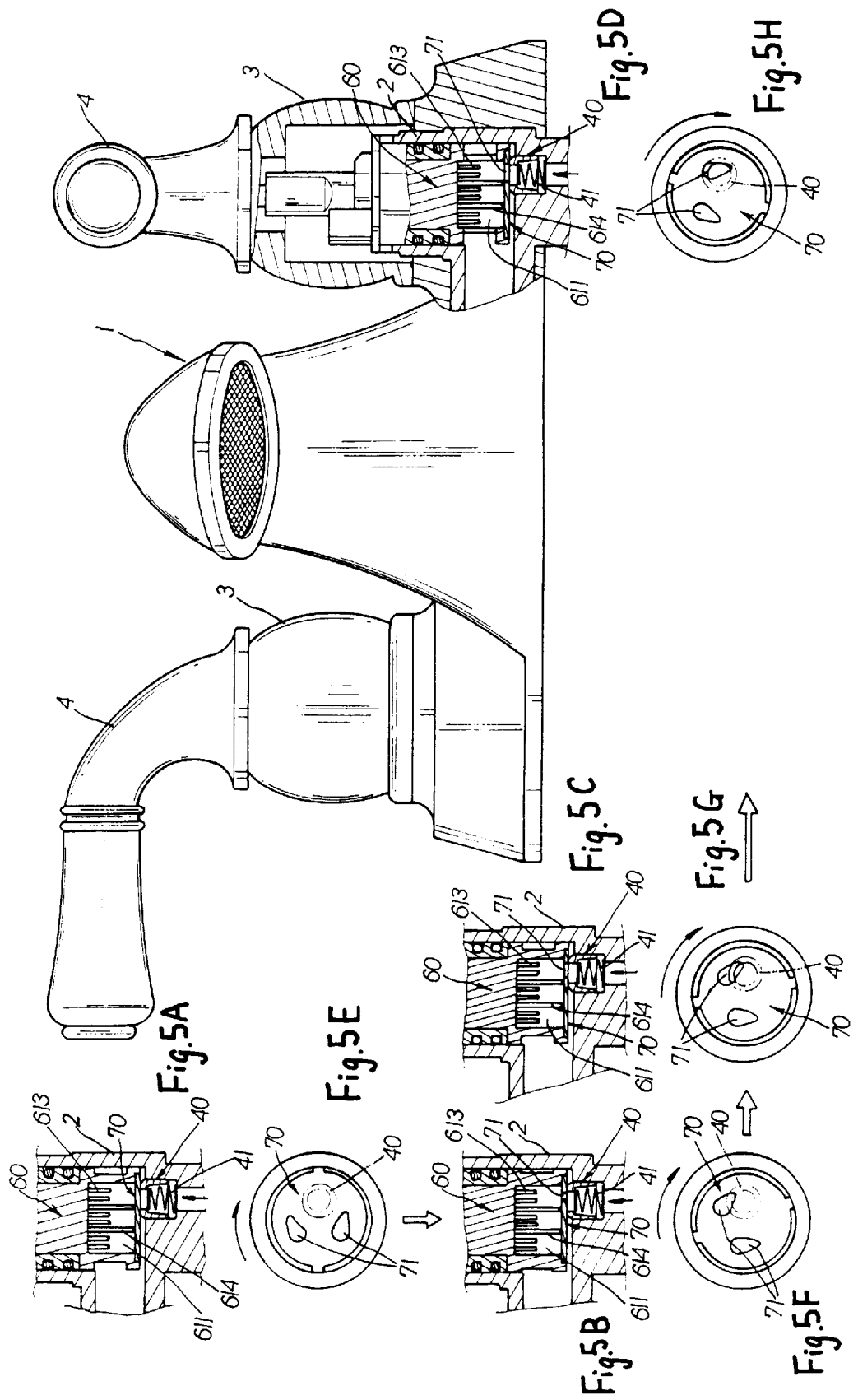

CONTROL VALVE FOR USE IN A DUAL HANDLED HOT/COLD WATER MIXING FAUCET

BACKGROUND OF THE INVENTION

The present invention relates to an improved control valve for use in a mixing faucet. The control valve has a valve mount, a spindle assembly and a water restraining plate having two outlets. The spindle assembly has a spindle rod and a two staged valve body having a chamber at the lower portion thereof. In the chamber there are a plurality of cylindrical posts, including four long posts and other short posts that are arranged in order. The cylindrical posts are used to reduce the noise of turbulent flow passing through the valve body and the four long posts support the water restraining plate in place and stop a spring biased sealing pad from dropping into the chamber via the outlets. Thus, the spindle rod of the spindle assembly can be rotated more smoothly and the noise produced in operation can be minimized.

Referring to FIG. 1, the perspective diagram showing the exploded components of a reversely disposed control valve of a prior art. Such a valve has a valve mount 10, a spindle 20 and a stop plate 30. The valve mount 10 has a countersink hole 11. The spindle 20 has a two-staged spindle body 21 and a spindle rod 22 extending from the spindle body 21 with a sealing ring 23 secured to the root of the spindle rod 22. A chamber 211 is defined at the portion having a larger diameter of the two-staged spindle body 21. A shoulder 212 is disposed at the top edge of the chamber 211. An outlet cut 214 is disposed on the wall of the chamber 211 and two parallel vertical ribs 213 are placed on each side of the outlet cut 214. The stop plate 30 has a crescent-shaped discharge opening 31 and a locking lug 32 positioned at each of two opposite sides thereof so as to secure the stop plate 30 to the spindle body 21 by engaging the lugs 32 with the paired ribs 213. FIG. 1A shows the assembly of the prior art valve in a normal position.

Referring further to FIGS. 2A–2H, the detailed operation modes of the prior art of FIG. 1 are illustrated in a step-by-step manner. In operation, the conventional control valve is placed in a cavity 2 of a mixing faucet 1 and is locked in place by a cap 3 and a handle 4, as shown in FIG. 5D. The stop plate 30 abuts against a sealing pad 40 biased by a spring 41. The clockwise rotation of the spindle rod 20 varies the relative position of the discharge opening 31 and the sealing pad 40 so as to gradually vary the volume of discharged water via the opening 31.

There are three drawbacks associated with such a prior art control valve given as below:

1. When the valve is closed, some air will remain in the chamber 211, and the reopening.,of the valve to permit water to flow in will-cause the air to produce noise as a result of resonance.

2. The stop plate 30 is easily deformed as a result of impact of the discharged water, and the sealing pad 40 is easy to drop into the opening 31 of the stop plate 30 when it is placed at its full-discharge position, as shown in FIG. 2D.

3. The stop plate 30 engaged with the spindle body 21 by way of the lugs 32 and the ribs is easily separated from the spindle body 21.

SUMMARY OF THE INVENTION

Therefore, the primary object of the present invention is to provide an improved control valve for a dual-handled hot/cold water mixing faucet which has three rings of cylindrical posts housed in a chamber through which water is led so as to make the resonance noise caused by the water flowing through the valve to be minimized and to make water flow in a more smooth manner.

Another object of the present invention is to provide an improved control valve for a mixing faucet wherein four long cylindrical posts housed in the chamber are used to support a water restraining plate in place, preventing the water restraining plate from deformation in operation in one aspect and preventing a sealing pad from dropping into the outlets defined on the water restraining plate so as to make the spindle rod rotate in a more smooth manner.

One further object of the present invention is to provide an improved control valve wherein the water restraining plate is placed in a shoulder defined at the top edge of the chamber and is firmly retained in place by two lugs engaged with two cuts on the periphery of the top edge of the chamber.

BRIEF DESCRIPTION OF THE DRAWINGS

FIG. 1 is a perspective diagram showing the exploded components of a conventional control valve of a mixing faucet;

FIG. 1A is a diagram showing an assembly of the conventional faucet shown in FIG. 1;

FIGS. 2A–2H are sectional diagrams showing the detailed operation steps of the conventional faucet;

FIG. 3 is a perspective diagram showing the exploded components of the present invention;

FIG. 3A is a plane view of the cylindrical posts disposed in the chamber;

FIG. 4 is a diagram showing the assembly of the present invention;

FIGS. 5A–5H are sectional diagrams showing the detailed operation modes of the present invention.

DETAILED DESCRIPTION OF THE PREFERRED EMBODIMENT

Referring to FIG. 3, the exploded components of the control valve of the present invention are reversely illustrated perspectively. The control valve of the present invention is comprised of a valve mount 50, a spindle assembly 60 and a water restraining plate 70.

The valve mount 50 is a hollow tube having a countersunk through hole 51 which has a smaller diameter at the upper portion and a larger diameter at the lower portion. The spindle assembly 60 is made up of a two-staged valve body 61 and a spindle column 62 extending from the valve body 61. A sealing ring 63 is attached to the root of the spindle column 62.

A chamber 611 is defined at the lower portion of the two-staged valve body 61 and a peripheral supporting shoulder 612 is disposed at the top edge of the valve chamber 611. There are three rings of vertical cylindrical rods disposed in the chamber 611, the outer and inner rings of the vertical rods are of short vertical rods 613 and the intermediate ring of vertical rods are mixture of four long vertical rods 614 and a plurality of short vertical rods 613.

The top edge of the two-staged valve body 61 is provided with a vertical flange 615 on the periphery thereof with two recesses 616 defined thereon. There are two symmetric discharge openings 617 defined on the wall of the larger portion of the two-staged valve body 61. The water restraining plate 70 made of stainless steel has two tear-drop shaped outlets 71. There are two symmetrically disposed T-shaped lugs 72 defined on the water restraining plate 70 and engaged with the two corresponding recesses 616 for fixing purpose.

Referring to FIG. 4, the perspective diagram showing the assembly of the present invention. As further shown in FIGS. 5A–5H, the operation modes of the present invention are illustrated in details. In assembly, the spindle rod 62 of the spindle assembly 61 is led through the two-staged hole of the valve mount 50 with the spindle rod 62 partially extended outwardly from the valve mount, as shown in FIG. 4. The smaller portion of the two-staged spindle assembly 60 is housed in the larger portion of the two staged hole 51 of the valve mount 50.

The water restraining plate 70 is placed in the shoulder 612 surrounded by the top vertical flange 615 and is secured in place by engaging the two T-shaped lugs 72 with the recesses 616 by bending the same downwardly. The plate 70 is also supported in place by the four long cylindrical rods 614 in the chamber 611 of the spindle assembly 61 so as to prevent the plate 70 from deformation due to impact of incoming water.

In assembly, the control valve assembly of the present invention is housed in a receiving cavity 2 of a mixing faucet 1 and a locking cap 3 and a handle 4 are mounted onto the faucet 1. The water restraining plate 70 is in abutment against a sealing pad 40 biased by a spring 41. The clockwise rotation of the spindle rod 62 will vary the relative position of the outlets 71 of the water restraining plate 70 and the sealing pad 40, as shown in FIGS. 5A–5H, i.e., the opening level of the outlets 71 as well the volume of discharged water are accordingly varied.

There are a number of advancements associated with the control valve of the present invention given as below:

1. The three rings of cylindrical rods housed in the chamber 611 of the spindle assembly 60 can reduce the volume of air left in the chamber 611 and water therein is led windingly through the chamber 611 so as to minimize the resonance noise in operation and make the water discharged in a more smooth manner.

2. The water restraining plate 70 is supported in place by the four long cylindrical rods 614 and is kept well in balance and is prevented from deformation due to impact of water pressure applied thereon and the sealing pad 40 is effectively stopped from dropping into the chamber via the outlets 71.

3. The T-shaped lugs 72 of the water restraining plate 70 engage firmly with the two recesses 616 of the spindle assembly 60 so as to make the plate 70 secure safely in place without easily being disengaged from the spindle assembly 60.

I claim:

1. A water mixing faucet control valve comprising a valve mount, a spindle assembly mounted in the valve mount and a water restraining plate attached to the spindle assembly, said valve mount comprising a hollow tube having a countersunk through hole and said spindle assembly comprises a spindle body with a spindle rod having a sealing ring attached to a root of said spindle rod, a chamber formed in the spindle body having two discharge openings through a wall bounding said chamber, a shoulder formed on an edge of said chamber, said spindle rod extending through the countersunk through hole of said valve mount and partially sticks out of the valve mount, said control valve further comprising a plurality of cylindrical rods extending into said chamber from said spindle body, the plurality of rods arranged in an outer circular array comprising a first plurality of rods, an inner circular array comprising a second plurality of rods and an intermediate circular array located between the outer and inner circular arrays, a plurality of rods in the intermediate circular array having a length greater than lengths of rods in the outer and inner circular arrays;

a flanged wall located on said spindle assembly having a plurality of recesses on a periphery thereof;

said water restraining plate having two tear-drop shaped outlet openings and two symmetric T-shaped lugs disposed on the periphery thereof, said water restraining plate being secured to said spindle assembly by engagement of said T-shaped lugs with said recesses on said flanged wall, said rods in the intermediate circular array contacting a side of said water restraining plate so as to support the same firmly in place.

* * * * *